Aug. 31, 1965 YOSHIRO UCHIDA 3,203,071
DUAL TURRET HEADS TYPE HORIZONTAL BORING MACHINE
Filed Nov. 19, 1962 4 Sheets-Sheet 1

INVENTOR
Yoshiro Uchida

BY *Wenderoth, Lind & Ponack*

ATTORNEYS

Aug. 31, 1965  YOSHIRO UCHIDA  3,203,071
DUAL TURRET HEADS TYPE HORIZONTAL BORING MACHINE
Filed Nov. 19, 1962  4 Sheets-Sheet 2

INVENTOR
Yoshiro Uchida

BY Wenderoth, Lind & Ponack

ATTORNEYS

Aug. 31, 1965  YOSHIRO UCHIDA  3,203,071
DUAL TURRET HEADS TYPE HORIZONTAL BORING MACHINE
Filed Nov. 19, 1962  4 Sheets-Sheet 3
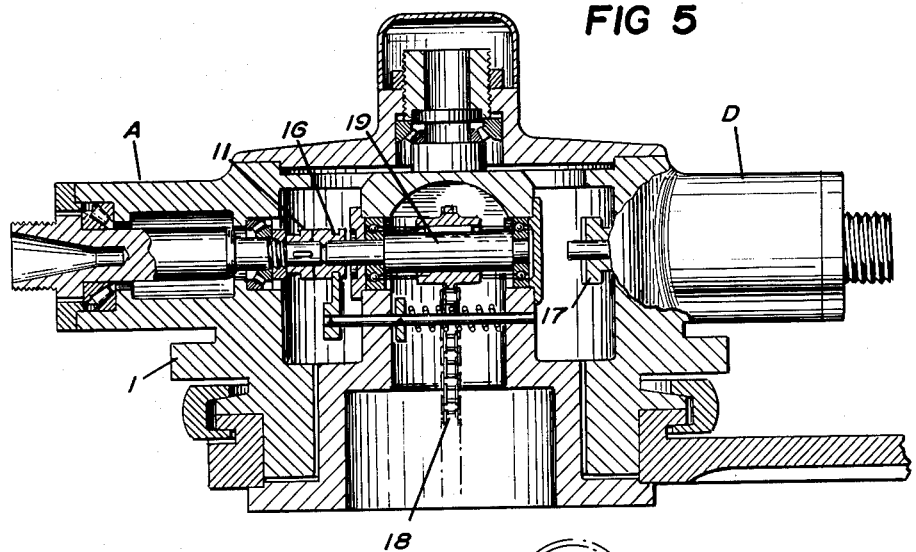
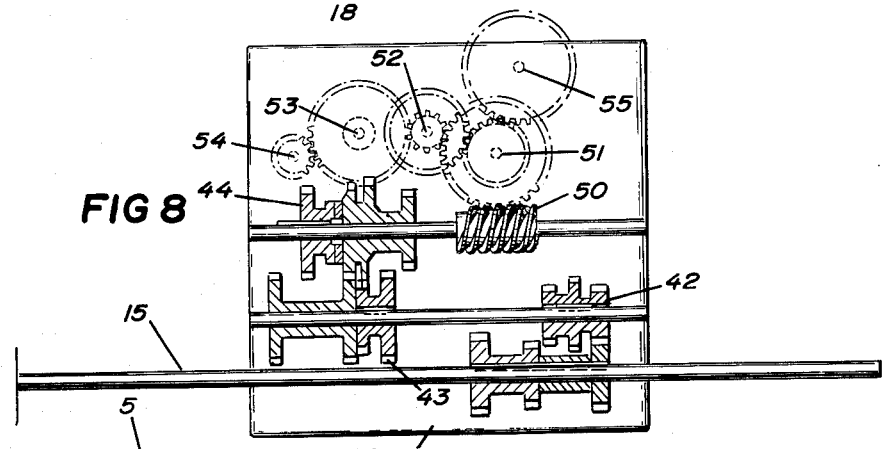
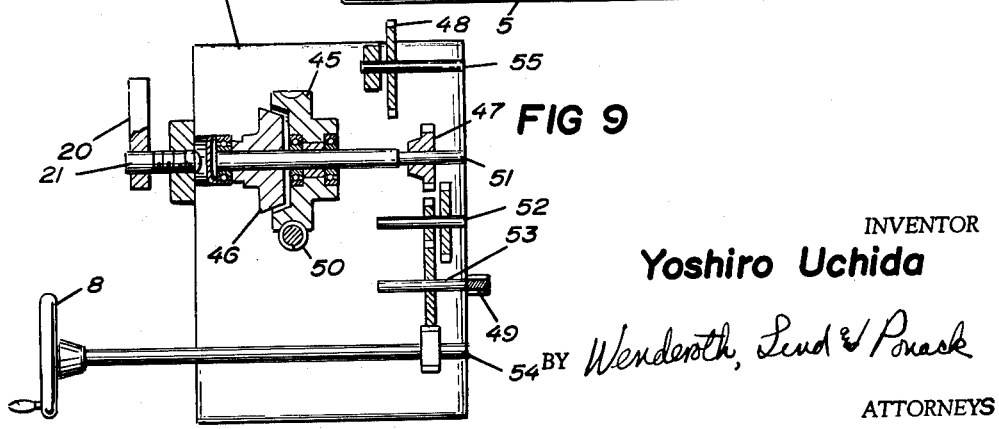
INVENTOR
Yoshiro Uchida
BY Wenderoth, Lind & Ponack
ATTORNEYS Aug. 31, 1965 YOSHIRO UCHIDA 3,203,071
DUAL TURRET HEADS TYPE HORIZONTAL BORING MACHINE
Filed Nov. 19, 1962 4 Sheets-Sheet 4
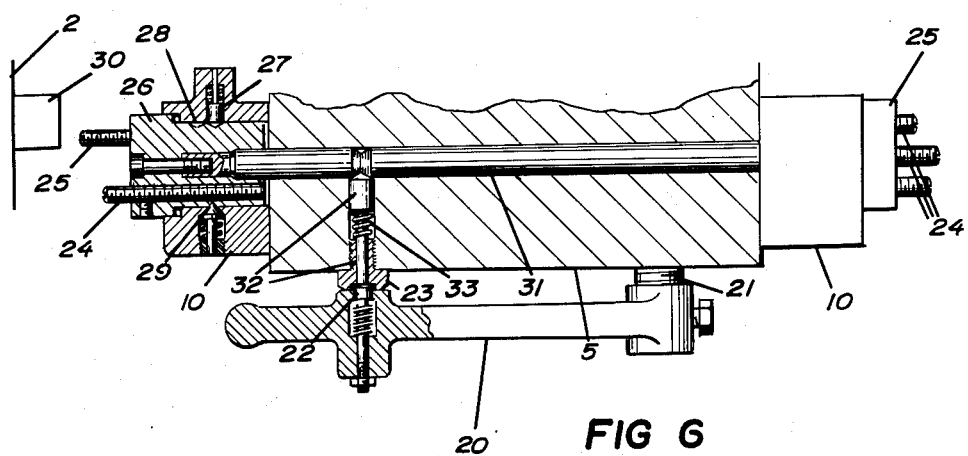
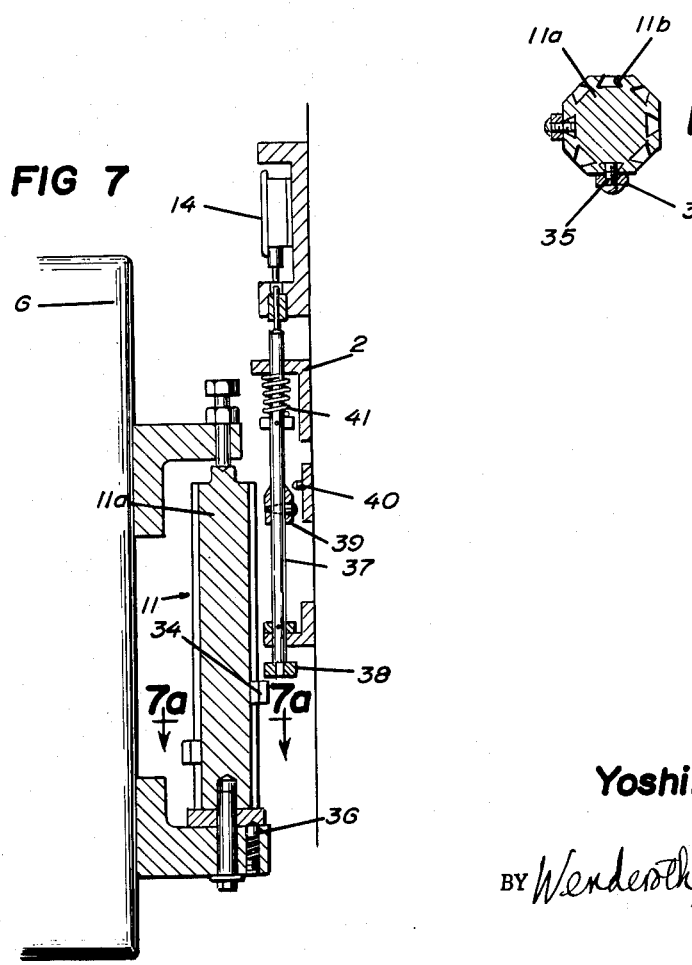
INVENTOR
Yoshiro Uchida
BY Wenderoth, Lind & Ponack
ATTORNEYS

United States Patent Office 3,203,071
Patented Aug. 31, 1965

3,203,071
DUAL TURRET HEADS TYPE HORIZONTAL
BORING MACHINE
Yoshiro Uchida, Higashi-Katsushika-gun, Japan, assignor
to Hitachiseiki Kabushiki Kaisha, Tokyo, Japan
Filed Nov. 19, 1962, Ser. No. 238,532
5 Claims. (Cl. 29—36)

This invention relates to a dual turret head type horizontal boring machine which is capable of performing many different collective functions easier and faster.

Various kinds of conventional boring machines have only one spindle for machining work pieces, and roughing and finishing boring operations are performed by changing the tools of the spindle. Moreover, as the holes to be bored in machine parts are almost always located opposite to each other on two spaced walls of the parts, a long boring bar and a support at the middle or end thereof is necessary in order to align the center lines of the holes. This results in loss of time in the changing, setting up and positioning of the tools.

This invention completely eliminates the above mentioned shortcomings of the conventional boring machines.

The dual turret head type horizontal boring machine is a composite type machine which is comprised of two columns mounted opposite to each other on a base. Two turret heads which are mounted on the columns, are equipped with several spindles adapted to hold tools for roughing, finishing, step machining, facing, etc. It is also provided with turret indexing devices, a frame which moves vertically between two columns, a carriage which moves transversely on the frame, and a table moving longitudinally on the carriage.

In order that the invention may clearly be understood and carried into effect the same will now be described by aid of the accompanying drawings, in which:

FIG. 5 is a sectional view, on an enlarged scale, of one of the turrets;

FIG. 6 is a sectional view, on an enlarged scale, of the longitudinal and cross feed stop mechanism;

FIG. 7 is a sectional view, on an enlarged scale, of the vertical feed stop mechanism;

FIG. 7a is a sectional view on line 7a—7a of FIG. 7; and

FIGS. 8 and 9 are front and top sectional views of the interior of the feed gear box.

Figure 1:
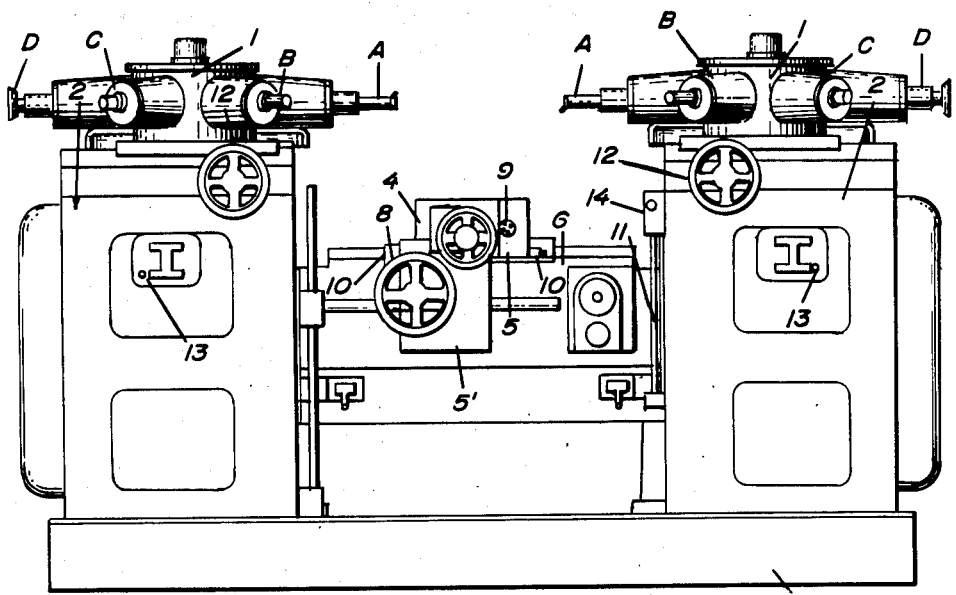
FIG. 1 is a front view of the machine according to the invention.
Figure 2:
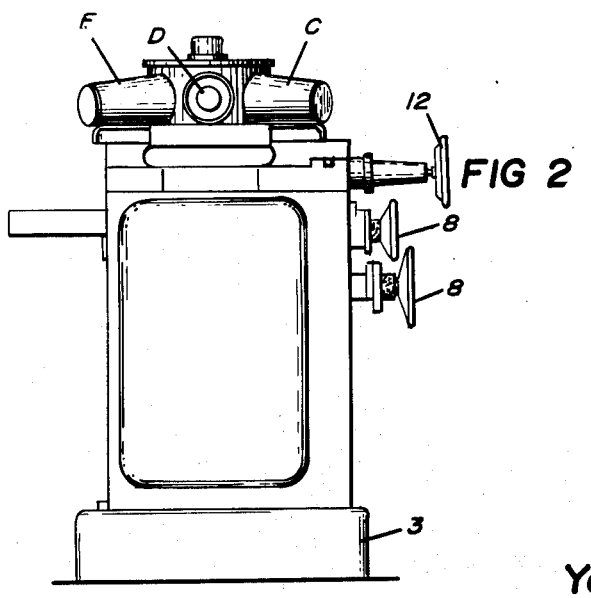
FIG. 2 is a side elevational view of the machine of FIG. 1.
Figure 3:
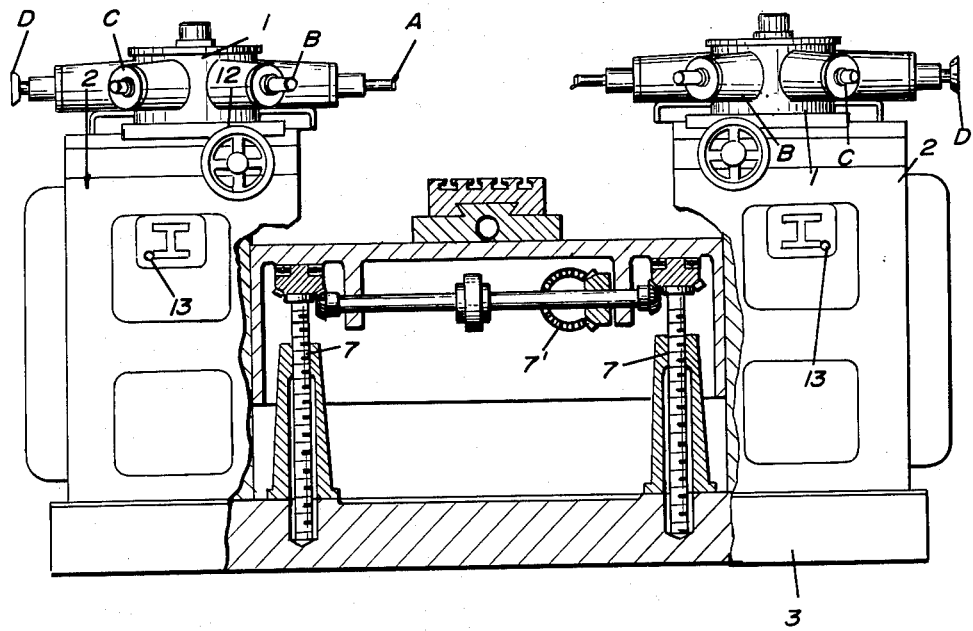
FIG. 3 is a front view partly in cross section, of the machine of FIG. 1.
Figure 4:
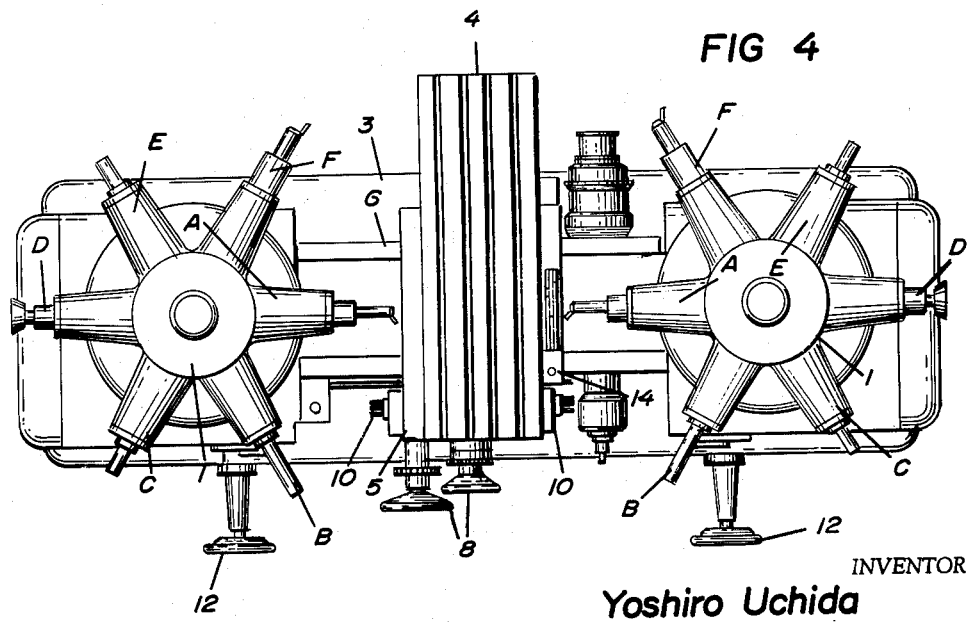
FIG. 4 is a plan view of the machine of FIG. 1.

Referring now more particularly to FIGS. 1 and 2 of the drawings, the numeral 1 indicates two spaced turret heads each of which is provided with several spindles A, B, C, D, E and F on their turret faces and with turret indexing devices. The spindles are fitted with tools for roughing, finishing, step machining, facing, etc. in predetermined positions in accordance with the machining size. Therefore, operators only need to index the turret heads before operation. Moreover, the rotation of the various spindles takes place only when the spindles are in the A position as shown clearly in FIG. 4.

The mechanism as shown in FIG. 5 drives the spindle which has been indexed to the A position. A transmission axle 19 has a clutch 16 at its extremity at the A position of the column 2, and axle 19 is turned by a power transmission chain 18 with variable speed changes, located within the column 2. A clutch 17 is positioned on the inner end of each spindle to engage clutch 16 only when the spindle is in the A position as shown in FIG. 5. The engaging of the clutches thus turns only the spindle in the A position.

Located at opposite ends of a base 3 are two columns 2 which enclose the driving and speed changing mechanism for the spindles. The turret heads 1 are mounted on these columns. A table 4 moving longitudinally along a line perpendicular to the line between the turret heads 1 is mounted on a carriage 5 which is movable along the line between turret heads 1 on a frame 6. The frame 6 is supported by two vertical threaded shafts 7, and moves vertically when rotation of a shaft 7' connected with two threaded shafts 7 rotates the latter shafts. The numeral 8 indicates handlevers for the table 4 and the carriage 5. The numerals 9, 10 and 11 indicate automatic stopping means for stopping and positioning the carriage 5 and the frame 6. The numeral 12 indicates a turret indexing and locking handle, 13, a speed change lever for the spindles and 14, an indicator for the stoppers.

FIG. 6 is a sectional view of the automatic stopping means 10.

FIG. 6 shows a feed disengaging lever 20 for turning the multiple thread screw 21 which engages the cone clutch within the gear box 5 to start the power feed. A pin 22 in a recess in the lever 20 is urged by a spring into a recess in collar 23 and prevents further movement of the multiple thread screw 21. Numerals 24, 25, etc., designate the individual positioning stopper screws located at six points around a flange 26 rotatably mounted in the body 10a of the stopping means. The flange 26 is indexed in 6 equal divisions by a spring loaded pin 27 engageable in recesses in the flange body. Moreover, the longitudinal positions of the flange 26 is fixed by a spring loaded pin 29 which is held in one of the V slots 28 in the flange.

FIG. 6 shows the various parts in their positions when the carriage 5 is driven by the power feed engaged so as to feed to the left. When the end of the stopper screw 25 hits the metal bumper 30 on the column 2, flange 26 and a rod 31, attached to flange 26, are pushed to the right. This causes a pin 32, which is engaged in a V slot in rod 31 to override said slot against the action of spring 33. Pin 32 pushes pin opposing pin 22 back into the lever 20. Lever 20 is then disengaged from collar 23 and drops down to loosen the multiple thread screw 21. This disengages the cone clutch and stops the power feed.

In controlling the use of the next tool, the position at which the power feed is stopped is established by indexing the flange 26 to a position where the stopper screw 24 touches 30. The power feed mechanism control by stopping means 9 is practically the same as the aforementioned mechanism.

FIGS. 7 and 7a show details of stoppers 11 and 14 of FIG. 1 for controlling vertical movement of frame 6. A stopper body 11a is octagonal or hexagonal in cross section with dovetail shaped grooves 11b in the faces. Stops 34 are affixed at various points along the grooves with set screws (not shown) at appropriate locations. Each face of stopper body 11a can be indexed to lie adjacent the end member 38 on actuating rod 37 against the action of the spring loaded pin 36.

FIG. 7 shows the parts in positions in which the stop 34 strikes end member 38 as the frame 6 moves upwardly and the rod 37 is moved against the action of a spring 41 and pushed upwards. A dog 39, attached to rod 37, engages a micro-switch 40 to switch off the power supply and stop the upward movement of the power feed of the frame 6 at this time. The stopping position of the frame can be read accurately on an indicator 14 located at the upper end of the rod 37. If the indicator does not show the correct "0," the frame 6 can be moved up and down manually and adjust to "0."

As shown in FIG. 8 and FIG. 9, the feed gear box 5 has therein a longitudinal feed for the carriage 5 and a cross feed for the table 4. Numeral 15 indicates a feed shaft which is driven from the revolving part of the spindle. The speed of revolution of the feed shaft can be changed in six ways by a series of changes in the engagement of the slide gears 42 and 43 within the feed gear box 5, as shown in FIG. 8. It can also be reversed by turning the worm 50 by engagement of gear 44 on the same shaft as worm 50.

The worm 50 causes the worm wheel 45 to rotate freely, as shown in FIG. 9. When the disengaging lever 20 is moved up, the multiple thread screw pushes the cone 46 against worm wheel 45 and the revolution of wheel 45 is transmitted to 51 spindle via cone 46. Changes in the engagement of the slide gear 47 transmit the revolution of spindle 51 to gear 48 and into the cross movement of the table. It may also cause horizontal movement of the carriage 5 via shafts 52, 53 and the gears thereon and the gear 49.

As mentioned above, this horizontal boring machine has several spindles, A, B, C, D, E and F on the turret heads 1, which are fitted with a variety of tools for roughing, finishing, step machining, facing, etc. in predetermined positions, so that operators only need to index the turret heads before operation. Moreover, both turret heads are located opposite to each other on the base, to enable simultaneous boring of holes from both sides of the work piece. Therefore, holes in which the center lines are correctly aligned, are bored quickly by using short and rigid boring bars. Moreover, the positions of the holes may be determined easily and correctly by indexing the multistage stopping means 9 and 11 which are utilized for end machining of holes and positioning.

In short, it is evident that this boring machine which is capable of performing many functions collectively and easily, is more efficient than the conventional boring machines. It is also operated easily by ordinary workmen. Moreover, if a 90° indexing table is attached to the table, it is possible to bore holes easily and efficiently, in the four faces of workpieces, such as in the gear boxes of machines.

What I claim:

1. A dual turret horizontal boring machine, comprising two spaced turret heads each rotatable around a vertical axis and having a plurality of horizotnal spindles adapted to be fitted with different tools, means in each turret head for rotatably driving only the spindle which is directed toward the other turret head, a work holder between said turret heads adapted to hold work fixed relative to the work holder, and means coupled to said work holder for moving said work holder reciprocally and horizotnally along a line between said turret heads, horizontally along a line transverse to the line between said turret heads, and vertically with respect to a horizontal line between said turret heads.

2. A dual turret horizotnal boring machine as claimed in claim 1 in which said driving means for the spindles comprises a transmission shaft horizontally positioned in said turret head, one end of said shaft being directed toward the other turret head, a clutch member on the end of said transmission shaft toward said other turret head, each spindle having a clutch member on the inner end thereof adapted to engage with the clutch member on the end of the transmission shaft when the spindle is directed toward the other turret head, and means coupled to said tansmission shaft for driving said transmission shaft.

3. A dual turret horizontal boring machine as claimed in claim 1 in which said means coupled to said work holder for moving said work holder comprises stop means on said work holder engageable with abutment means on said turrets for disengaging said work moving means when said work holder reaches predetermined positions relative to said turrets, each stop means having a plurality of stops thereon corresponding to the number of spindles in each turret, and each stop being adjustable, whereby the movement of the work holder can be adjusted and varied for different types of tools in said spindles.

4. A dual turret horizontal boring machine as claimed in claim 3 in which at least one of said stop means comprises a flange, said stops being a plurality of threaded studs threaded into said flange and adapted to project axially of the flange with the free ends at different distances from the face of the flange, a movable rod to which said flange is coupled, a pin cammed to said rod and movable transversely of said rod when said rod is moved axially of itself, and a clutch means having an arm thereon adapted to rotate to engage and disengage said clutch means for driving said work holder, said arm having a spring loaded pin thereon, and said stop means having a recess therein into which said spring loaded pin is projected and into which said transversely movable pin is movable, whereby when a stop engages an abutment means said movable rod cams said transversably movable pin into said recess to drive said spring loaded pin on the clutch arm out of the recess to release the clutch arm and disengage the clutch means.

5. A dual turret horizontal boring machine as claimed in claim 3 in which at least one of said stop means comprises a vertically extending stop body having a polygonal cross section with a number of sides corresponding to the number of spindles in a turret, said stops being members movable along each side of said stop body and adapted to be fixed at various positions along the length of the stop body, and a switch means adjacent said stop body on one of said turrets adapted to be engaged by said stops as said stop body moves past said turret during movement of said work holder.

References Cited by the Examiner

UNITED STATES PATENTS

| | | | |
|---|---|---|---|
| 542,461 | 7/95 | Bogert | 90—58.1 |
| 589,138 | 8/97 | Prentice | 29—36 |
| 593,491 | 11/97 | Pearson | 90—58.1 |
| 1,338,742 | 5/20 | Lofton | 29—36 |

RICHARD H. EANES, JR., *Primary Examiner.*